US012595009B2

(12) United States Patent
Lee

(10) Patent No.: US 12,595,009 B2
(45) Date of Patent: Apr. 7, 2026

(54) SADDLE AND BICYCLE WITH THE SADDLE

(71) Applicant: Cheng Uei Precision Industry Co., Ltd., New Taipei City (TW)

(72) Inventor: Peng Yuan Lee, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 426 days.

(21) Appl. No.: 18/487,064

(22) Filed: Oct. 14, 2023

(65) Prior Publication Data

US 2024/0166287 A1 May 23, 2024

(30) Foreign Application Priority Data

Nov. 22, 2022 (CN) .......................... 202223106635.9

(51) Int. Cl.
| | |
|---|---|
| B62J 1/08 | (2006.01) |
| B62J 45/41 | (2020.01) |
| G01L 1/00 | (2006.01) |

(52) U.S. Cl.
CPC ................. B62J 1/08 (2013.01); B62J 45/41 (2020.02); G01L 1/00 (2013.01)

(58) Field of Classification Search
CPC ....... B62J 1/08; B62J 45/41; B62J 1/26; B62J 1/28; B62J 11/19; B62J 45/42; G01L 1/00
See application file for complete search history.

(56) References Cited

FOREIGN PATENT DOCUMENTS

CN          211076153  U        7/2020

*Primary Examiner* — Jason D Shanske
*Assistant Examiner* — Al-Birr Rahman Chowdhury

(57) ABSTRACT

A saddle includes a main body, a protecting layer, a sensing module, a base cover and a bow element. An inside of the main body defines an accommodating space. A rear end of the bottom surface of the main body is recessed inward to form a notch. The protecting layer is attached to a top of the main body. The sensing module is disposed in the accommodating space through the notch. The sensing module includes a circuit board and a barometric pressure sensor. The barometric pressure sensor is disposed on a top surface of the circuit board. The barometric pressure sensor and the main body are separated by the accommodating space. The base cover is disposed to the bottom surface of the main body. A top surface of the base cover extends upward to form a fastening pillar. The fastening pillar is inserted into the accommodating space.

11 Claims, 8 Drawing Sheets

100

100

100

SADDLE AND BICYCLE WITH THE SADDLE

CROSS-REFERENCE TO RELATED APPLICATION

The present application is based on, and claims priority from, China Patent Application No. 202223106635.9, filed Nov. 22, 2022, the disclosure of which is hereby incorporated by reference herein in its entirety.

BACKGROUND OF THE INVENTION

1. Field of the Invention

The present invention generally relates to a saddle, and more particularly to a saddle having a contactless sensor which contactlessly senses a pressure, and a bicycle with the saddle.

2. The Related Art

With the increasing popularity of a bicycle, the bicycle becomes an indispensable vehicle in people's daily lives. A saddle is an important part of the bicycle. A user rides the bicycle by sitting on the saddle. The saddle is usually made of a soft material, so that a usage comfortability of the user is improved conveniently.

A conventional saddle is used in a vehicle. The conventional saddle includes a main body and a detection element. The detection element is disposed in the main body. The detection element is used for detecting a pressure applied to the main body. The main body is a sponge structure. The main body is disposed to the detection element. The main body is formed by a foaming technology. The detection element is embedded in the main body, and the detection element contacts the main body.

However, the above-mentioned detection element of the conventional saddle is a contacting sensor, When the user sits on the saddle, the saddle is deformed by a weight of the user. Because the detection element contacts the main body, the deformed saddle presses the detection element. In that case, the detection element needs to use a mode of contacting a sensing pressure to judge whether the user is in a riding posture. Therefore, a mounting position of the detection element and a material of the main body are restricted. When the mounting position of the detection element is deviated from a preset position, the user directly touches the detection element to cause a misjudgment of the detection element, and an accuracy of contacting the sensing pressure by the detection element will be affected, so a manufacturing precision of the conventional saddle is highly required. In addition, after the saddle is used in a long time, the detection element and the main body are easily separated, when the detection element is squeezed repeatedly, the detection element causes an abrasion phenomenon, at last, the detection element has no way of judging whether the user is in the riding posture accurately.

Thus, it is essential to provide an innovative saddle having a contactless sensor which contactlessly senses a pressure, and a bicycle with the saddle. The innovative saddle just need a simple manufacturing technology to achieve a precise sensing degree, after the innovative saddle is used in a long time, the detection element is without causing an abrasion phenomenon.

SUMMARY OF THE INVENTION

An object of the present invention is to provide a saddle. The saddle includes a main body, a protecting layer, a sensing module, a base cover and a bow element. An inside of the main body defines an accommodating space penetrating through a bottom surface of the main body. A rear end of the bottom surface of the main body is recessed inward to form a notch. The notch is communicated with the accommodating space. The protecting layer is attached to a top of the main body. The sensing module is disposed in the accommodating space through the notch. The sensing module includes a circuit board and a barometric pressure sensor. The barometric pressure sensor is disposed on a top surface of the circuit board. The barometric pressure sensor and the main body are separated by the accommodating space. The barometric pressure sensor is a contactless sensor. The base cover is disposed to the bottom surface of the main body, and the base cover covers the notch, so the accommodating space forms an airtight space. Atop surface of the base cover extends upward to form a fastening pillar. The fastening pillar is inserted into the accommodating space to support the circuit board. The bow element is disposed to a bottom surface of the base cover.

Another object of the present invention is to provide a bicycle. The bicycle includes a frame, a headstock, two wheels and a saddle. The headstock is connected with a front end of the frame. The two wheels are connected with the front end of the frame and a rear end of the frame, respectively. The saddle is disposed to a middle of a top of the frame. The saddle includes a main body, a protecting layer, a sensing module, a base cover and a bow element. An inside of the main body defines an accommodating space. The accommodating space penetrates through a bottom surface of the main body. A middle of a rear end of the bottom surface of the main body is recessed inward to form a notch. The protecting layer is attached to a top of the main body. The sensing module is disposed in the accommodating space through the notch. The sensing module includes a circuit board and a barometric pressure sensor. The barometric pressure sensor is disposed on a top surface of the circuit board. The barometric pressure sensor and the main body are separated by the accommodating space. The barometric pressure sensor is a contactless sensor. The base cover is disposed to the bottom surface of the main body, and the base cover covers the notch and the accommodating space, so the accommodating space forms an airtight space. A top surface of the base cover extends upward to form a fastening pillar. The fastening pillar is inserted into the accommodating space from the notch to support the circuit board. The bow element is disposed to a bottom surface of the base cover and connected with the middle of the top of the frame.

Another object of the present invention is to provide a saddle disposed to a middle of a top of a frame of a bicycle. The saddle includes a main body, a protecting layer, a sensing module, a base cover and a bow element. The main body has an accommodating space formed inside of the main body. The accommodating space penetrates through a bottom surface of the main body. A notch penetrates through a middle of a rear end of the bottom surface of the main body. The notch is communicated with the accommodating space. The protecting layer is attached to a top of the main body. The sensing module is disposed in the accommodating space through the notch. The sensing module includes a circuit board, a barometric pressure sensor, a connector and a cable. The barometric pressure sensor is disposed on a top surface of the circuit board. The barometric pressure sensor and the main body are separated by the accommodating space. The barometric pressure sensor is a contactless sensor. The barometric pressure sensor judges whether a user sits on the saddle by sensing a variation of an internal air pressure of the main body. The connector is disposed on the top surface of the circuit board. One end of the cable is connected with the connector. The base cover is disposed to the bottom surface of the main body, and the base cover covers the notch and the accommodating space, so the accommodating space forms an airtight space. A top surface of the base cover extends upward to form a fastening pillar. The fastening pillar is inserted into the accommodating space from the notch to support the circuit board. The bow element is disposed to a bottom surface of the base cover and connected with the middle of the top of the frame.

As described above, the barometric pressure sensor senses the variation of the internal air pressure of the main body to make the saddle and the bicycle with the saddle judge whether the user sits on the saddle, and the saddle has the contactless sensor which contactlessly senses the pressure, so the sensing module of the saddle senses the variation of the internal air pressure of the main body by a contactless way. The bicycle with the saddle applies a keyless start system to replace an ordinary key, so that the bicycle has a better security.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
FIG. 1 is a perspective view of a bicycle in accordance with a preferred embodiment of the present invention.
Figure 1:
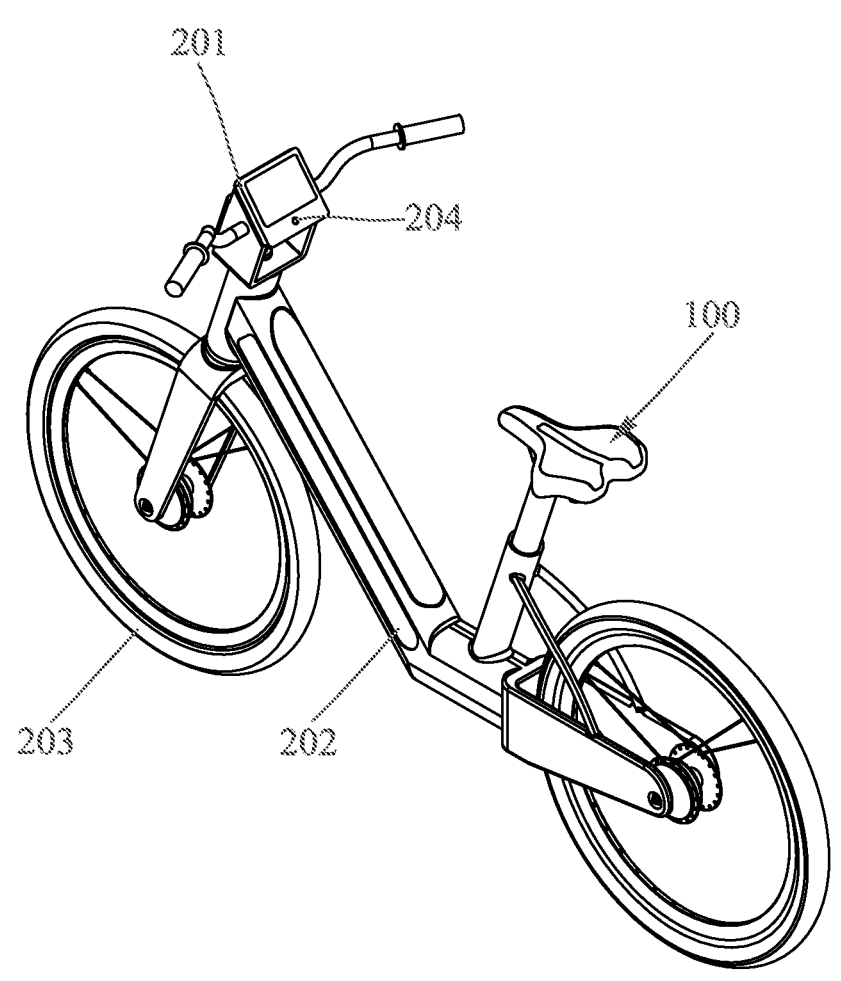
Figure 2:
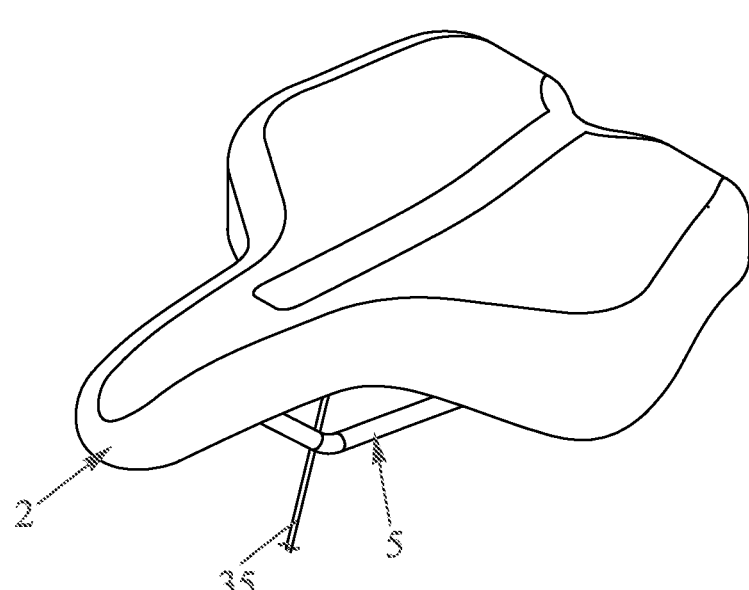
FIG. 2 is a perspective view of a saddle of the bicycle of FIG. 1.
Figure 3:
FIG. 3 is another perspective view of the saddle of FIG. 2.
Figure 3:
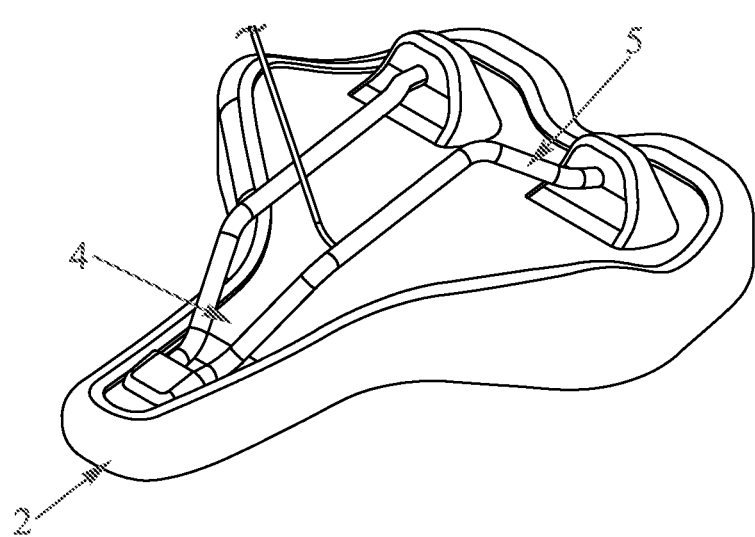
Figure 4:
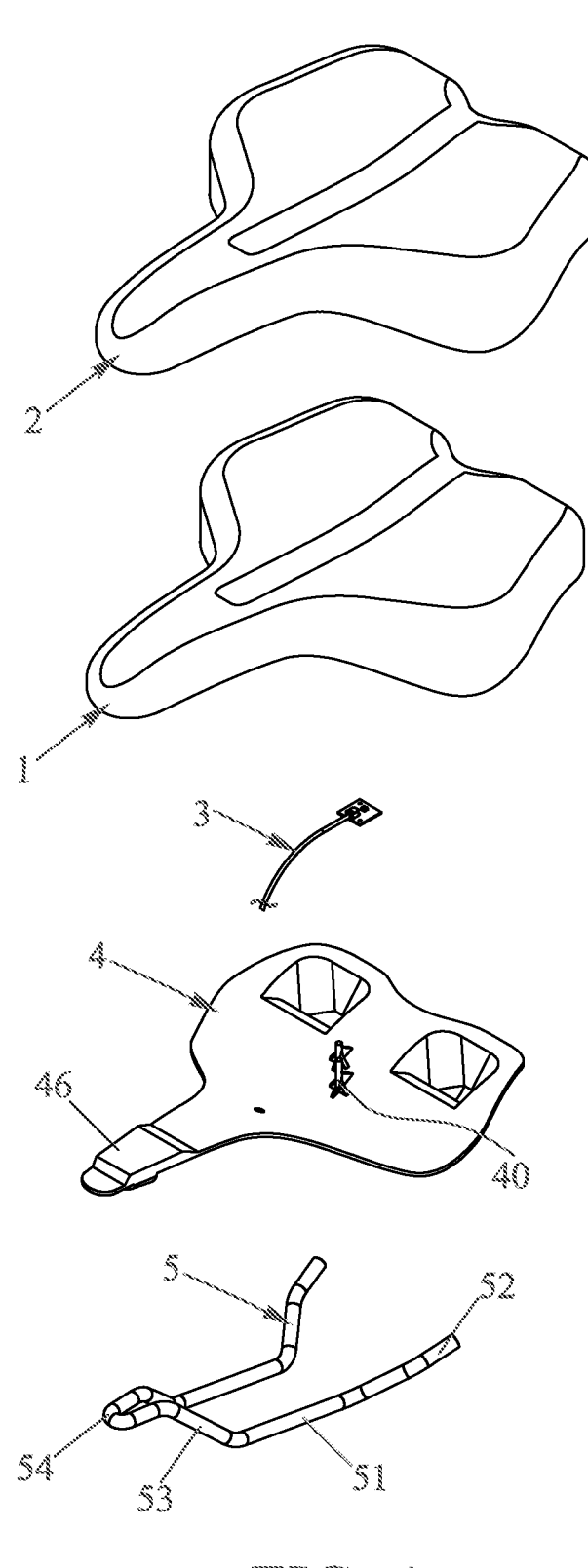
FIG. 4 is an exploded view of the saddle of FIG. 2.

With reference to FIG. 1 and FIG. 2, a saddle 100, and a bicycle 200 with the saddle 100 in accordance with a preferred embodiment of the present invention are shown. The bicycle 200 includes the saddle 100, a headstock 201, a frame 202 and two wheels 203.

Referring to FIG. 1, the saddle 100 is disposed to a middle of a top of the frame 202 of the bicycle 200. The frame 202 is a base body of the bicycle 200. The frame 202 is used for connecting and mounting components of the bicycle 200. The headstock 201 is connected with a front end of the frame 202. The headstock 201 controls a direction of the bicycle 200. The two wheels 203 are connected with the front end of the frame 202 and a rear end of the frame 202, respectively. The saddle 100 is located above the two wheels 203. The two wheels 203 are used for contacting a ground, so that a riding function of the bicycle 200 is realized by a rotation of the two wheels 203. In the preferred embodiment, the headstock 201 has a switch 204 which is exposed to an upper surface of the headstock 201. The switch 204 controls an electronic system of the bicycle 200. After a user sits on the saddle 100, the switch 204 is pressed for starting the electronic system of the bicycle 200. In practice, the switch 204 is an actuating switch or a fingerprint recognition switch to start the electronic system of the bicycle 200. The switch 204 applies a keyless start system to replace an ordinary key, so that the bicycle 200 has a better security.

Referring to FIG. 2 to FIG. 7, the saddle 100 includes a main body 1, a protecting layer 2, a sensing module 3, a base cover 4 and a bow element 5. The main body 1 is a sponge structure. In the preferred embodiment, the main body 1 which is the sponge structure is formed by a foaming technology. The protecting layer 2 is attached to a top of the main body 1. The protecting layer 2 protects the main body 1 to resist moistures and dusts. In the preferred embodiment, the protecting layer 2 is made of a leather material or a cloth material. In the practice, the protecting layer 2 is without being limited to be made of the leather material or the cloth material. The sensing module 3 is disposed in the main body 1. The sensing module 3 is a contactless sensor. The base cover 4 is disposed to a bottom surface of the main body 1. The bow element 5 is disposed to a bottom surface of the base cover 4 and is connected with the middle of the top of the frame 202 of the bicycle 200. In the preferred embodiment, the bow element 5 is made of a metal material, a deformable plastic material, a carbon fiber material or other elastically deformable materials.

Referring to FIG. 2 to FIG. 8, the main body 1 has a notch 11, a wire groove 12, a concave portion 13, and an accommodating space 14 formed inside of the main body 1. An inside of the main body 1 defines the accommodating space 14. The accommodating space 14 penetrates through the bottom surface of the main body 1. A middle of a rear end of the bottom surface of the main body 1 is recessed inward to form the notch 11. The notch 11 penetrates through the middle of the rear end of the bottom surface of the main body 1. The notch 11 is communicated with the accommodating space 14. The sensing module 3 is disposed in the accommodating space 14 through the notch 11. The sensing module 3 is mounted in the main body 1. The sensing module 3 and the main body 1 are separated by the accommodating space 14, so the sensing module 3 is without contacting the main body 1. The bottom surface of the main body 1 has the wire groove 12. A rear end of the wire groove 12 is connected with a middle of a front end of the notch 11. The wire groove 12 is communicated with the notch 11 and the accommodating space 14. A front end of the bottom surface of the main body 1 is recessed inward to form the concave portion 13. A corresponding mechanism of the base cover 4 is disposed in the concave portion 13 to realize that the base cover 4 is located to the main body 1, and the base cover 4 is fastened to the main body 1.

Figure 5:
FIG. 5 is another exploded view of the saddle of FIG. 2.
Figure 5:
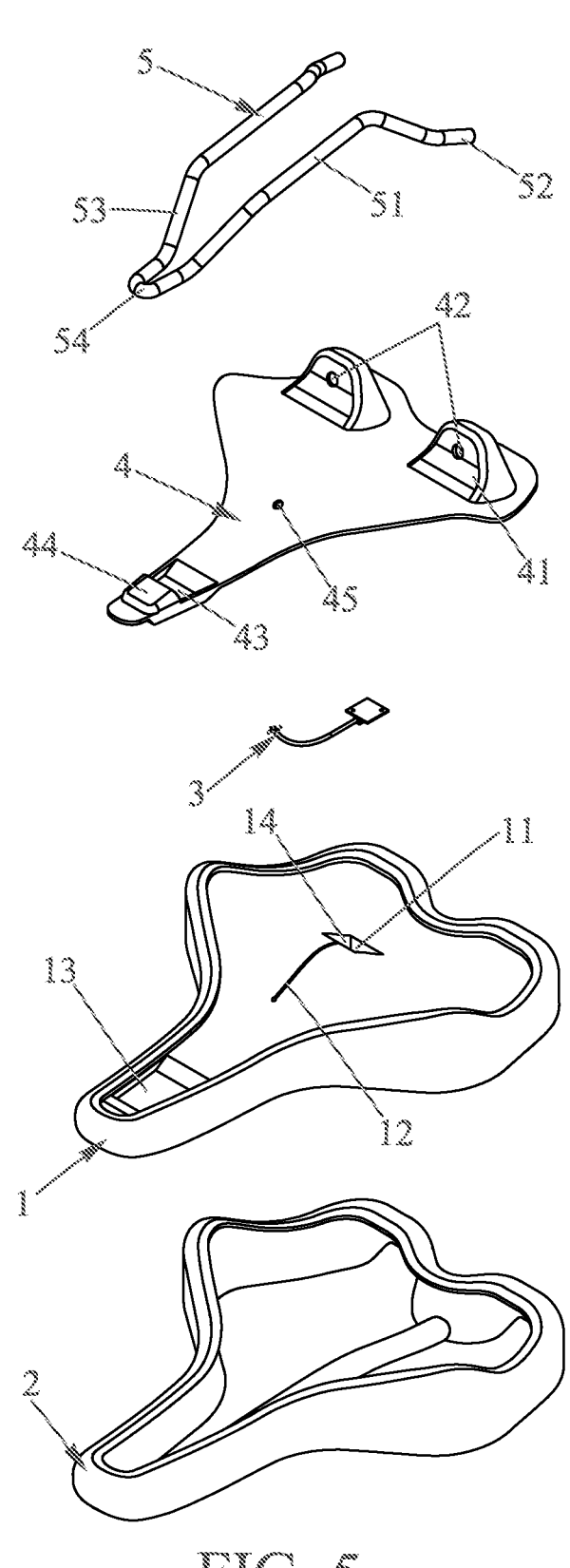
Figure 6:
FIG. 6 is a perspective view of a sensing module of the saddle of FIG. 2.
Figure 6:
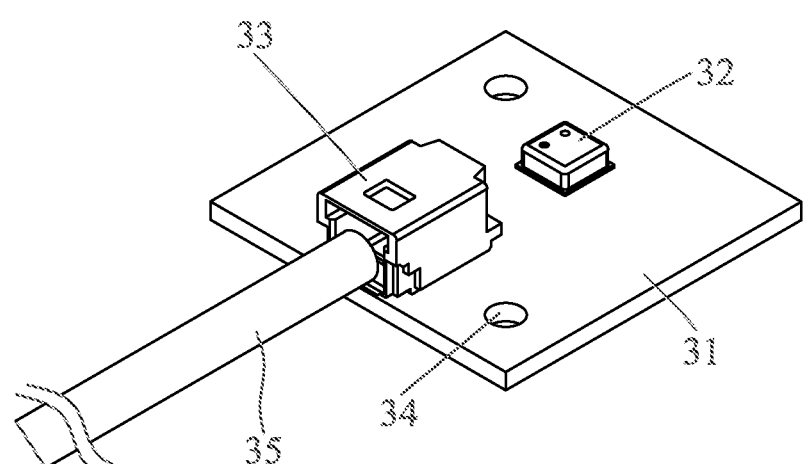
Figure 7:
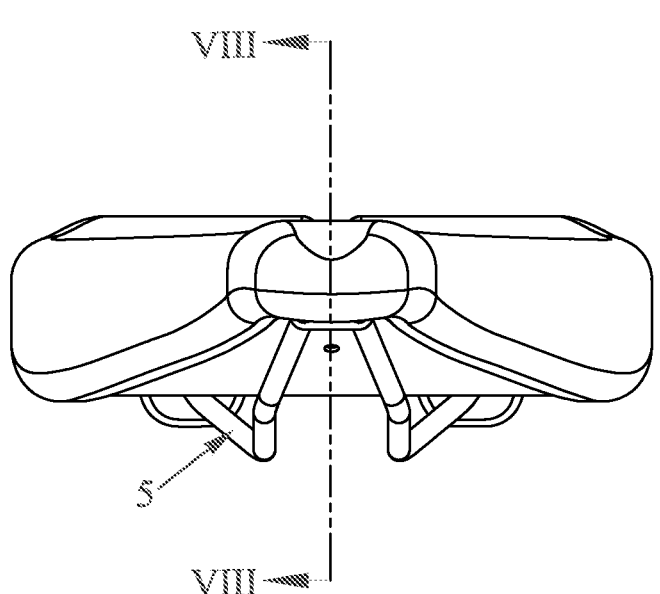
FIG. 7 is a diagrammatic drawing of the saddle of FIG. 2.
Figure 8:
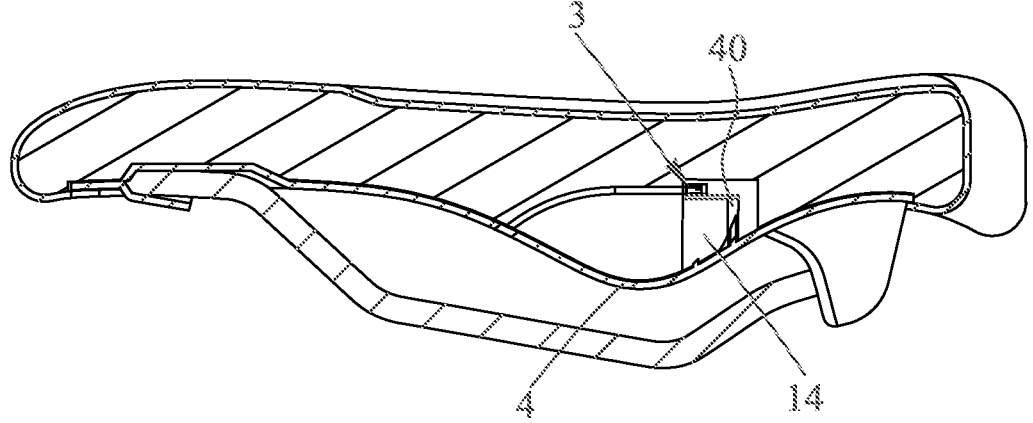
FIG. 8 is a sectional view of the saddle along a line VIII-VIII of FIG. 7.

Referring to FIG. 5 and FIG. 6, the sensing module 3 includes a circuit board 31, a barometric pressure sensor 32, a connector 33, a location hole 34 and a cable 35. The barometric pressure sensor 32 and the main body 1 are separated by the accommodating space 14. In the preferred embodiment, the sensing module 3 has the circuit board 31, the barometric pressure sensor 32, the connector 33, two location holes 34 and the cable 35. The barometric pressure sensor 32 is the contactless sensor. The barometric pressure sensor 32 is disposed on a top surface of the circuit board 31. The connector 33 is disposed on the top surface of the circuit board 31. In the preferred embodiment, bottoms of the barometric pressure sensor 32 and the connector 33 are disposed at the same level. The barometric pressure sensor 32 senses an internal air pressure of the main body 1 of the saddle 100. The barometric pressure sensor 32 judges whether the user sits on the saddle 100 by sensing a variation of the internal air pressure of the main body 1.

When the user sits on the saddle 100, the saddle 100 is squeezed by a weight of the user and the saddle 100 is deformed. Because the main body 1 is the sponge structure, an air pressure of the accommodating space 14 of the main body 1 is increased on account of a deformation of the saddle 100, and the internal air pressure of the main body 1 is increased, so that the barometric pressure sensor 32 senses the variation of the internal air pressure of the main body 1, and the barometric pressure sensor 32 judges whether the user sits on the saddle 100. In a concrete implementation, the main body 1 of the saddle 100 is able to be a non-sponge structure, the main body 1 of the saddle 100 is a silicone material structure. When the user sits on the saddle 100, the saddle 100 is squeezed by the weight of the user and the main body 1 of the saddle 100 is deformed, the internal air pressure of the main body 1 is increased. Because the main body 1 of the saddle 100 is the silicone material structure, a wall of the accommodating space 14 is deformed by an affection of the deformation of the main body 1 of the saddle 100, a volume of the accommodating space 14 becomes small, the barometric pressure sensor 32 senses the variation of the internal air pressure of the main body 1. The barometric pressure sensor 32 judges that the user sits on the saddle 100.

The connector 33 transmits a signal to an Internet of Things (IoT) device (not shown) or a controller (not shown) to wake up the electronic system of the bicycle 200 by the cable 35. At the moment, the switch 204 is able to start the bicycle 200. The location hole 34 penetrates through the top surface and a bottom surface of the circuit board 31. A quantity of the location hole 34 is corresponding to a corresponding section of the base cover 4. The cable 35 penetrates through a corresponding position of the base cover 4. The cable 35 is disposed in the wire groove 12 of the main body 1. The cable 35 is partially disposed in the main body 1. One end of the cable 35 is connected with the connector 33. The other end of the cable 35 is connected with the controller (not shown) along the frame 202 of the bicycle 200. The cable 35 is partially disposed in the wire groove 12 of the main body 1. In the concrete implementation, the barometric pressure sensor 32 directly transmits the signal to the IoT device (not shown) or the controller (not shown) by the cable 35. The barometric pressure sensor 32 of the sensing module 3 transmits the signal without the connector 33. So the cable 35 is soldered to the circuit board 31 directly. In the concrete implementation, the circuit board 31 has a wireless communication module. The barometric pressure sensor 32 directly transmits the signal to the IoT device (not shown) or the controller (not shown) by the wireless communication module. The barometric pressure sensor 32 of the sensing module 3 transmits the signal without being via the connector 33 and the cable 35.

Referring to FIG. 2 to FIG. 8, the base cover 4 is disposed to the bottom surface of the main body 1, and the base cover 4 covers the notch 11 and the accommodating space 14, so the accommodating space 14 of the main body 1 forms an airtight space. The base cover 4 has a fastening pillar 40, two restricting blocks 41, two restricting holes 42, a lacking groove 43, a shielding portion 44, a perforation 45 and a protruding block 46. In the preferred embodiment, the base cover 4 has two fastening pillars 40, the two restricting blocks 41, the two restricting holes 42, the lacking groove 43, the shielding portion 44, the perforation 45 and the protruding block 46. A top surface of the base cover 4 extends upward to form the fastening pillar 40. The fastening pillar 40 abuts against the bottom surface of the circuit board 31 of the sensing module 3. The fastening pillar 40 is corresponding to the location hole 34 of the sensing module 3. The fastening pillar 40 is inserted into the location hole 34 of the sensing module 3. A quantity of the fastening pillar 40 is corresponding to a quantity of the location hole 34 of the sensing module 3. The fastening pillar 40 is inserted into the accommodating space 14 of the main body 1 from the notch 11 to abut against the bottom surface of the circuit board 31 of the sensing module 3 so as to support the circuit board 31 of the sensing module 3.

Two portions of a rear end of the bottom surface of the base cover 4 extend downward to form the two restricting blocks 41. Each restricting block 41 is a hollow structure. The two restricting blocks 41 are corresponding to two corresponding locations of the bow element 5. The two restricting holes 42 penetrate through two front surfaces of the two restricting blocks 41, respectively. The two corresponding locations of the bow element 5 are inserted into the two restricting holes 42, and the two corresponding locations of the bow element 5 are fastened in the two restricting blocks 41 to realize that the bow element 5 is located to the base cover 4, and the bow element 5 is fastened to the base cover 4.

The front end of the bottom surface of the base cover 4 is recessed inward to form the lacking groove 43. A front end of the top surface of the base cover 4 extends upward to form the protruding block 46. The protruding block 46 is opposite to the lacking groove 43. The protruding block 46 is hollow. The protruding block 46 is disposed to the concave portion 13 of the main body 1. A corresponding segment of the bow element 5 is disposed in the lacking groove 43. The front end of the bottom surface of the base cover 4 extends downward to form the shielding portion 44. The shielding portion 44 is disposed to a front end of the lacking groove 43. When the corresponding segment of the bow element 5 is disposed in the lacking groove 43, the shielding portion 44 shields a part of the bow element 5. The shielding portion 44 prevents the bow element 5 from moving. The perforation 45 penetrates through the top surface and the bottom surface of the base cover 4. The cable 35 penetrates through the perforation 45, and the cable 35 is partially disposed in the main body 1.

The bow element 5 has two supporting portions 51, two insertion portions 52, two inclining portions 53 and a U-shaped combining portion 54. The two supporting portions 51 are corresponding to the two restricting blocks 41 of the base cover 4. Each insertion portion 52 is corresponding to one restricting block 41. Rear ends of the two supporting portions 51 extend rearward to form the two insertion portions 52, respectively. One end of each insertion portion 52 is connected with the rear end of one supporting portion 51. The other end of each insertion portion 52 is inserted into the restricting hole 42 of the one restricting block 41 of the base cover 4, and the other end of each insertion portion 52 is fastened in the one restricting block 41 of the base cover 4 to realize that the bow element 5 is located to the base cover 4, and the bow element 5 is fastened to the base cover 4. Front ends of the two supporting portions 51 slantwise extend frontward and inward to form the two inclining portions 53, respectively. The two inclining portions 53 are inclined upward from rear to front. Front ends of the two inclining portions 53 extend frontward, and then are bent towards each other and are connected with each other to form the U-shaped combining portion 54. The combining portion 54 is disposed to the lacking groove 43 of the base cover 4. The U-shaped combining portion 54 has a stable supporting force and a combining force.

When the user sits on the saddle 100, a pressing force is exerted on the bow element 5, so that the two supporting portions 51 are elastically propped up towards two opposite directions, and the two supporting portions 51 are apart away from each other to improve a combining strength, so that the two insertion portions 52 are stably inserted into the two restricting holes 42 of the two restricting blocks 41 of the base cover 4. The two supporting portions 51 are buckled with the frame 202 of the bicycle 200 to realize that the saddle 100 is located to the bicycle 200, and the saddle 100 is fixed to the bicycle 200.

When the user sits on the saddle 100, the saddle 100 is pressed downward, so a volume of the saddle 100 becomes smaller. At the moment, the accommodating space 14 inside the saddle 100 generates an instantaneous high air pressure. The internal air pressure of the main body 1 is increased. The barometric pressure sensor 32 senses the variation of the instantaneous internal air pressure of the main body 1. The saddle 100 senses the variation of the air pressure of the main body 1 to judge that the user sits on the saddle 100.

When the user leaves the saddle 100, the saddle 100 instantly restores to an original shape. At the moment, an inside of the saddle 100 generates the instantaneous internal air pressure. The barometric pressure sensor 32 senses the variation of the instantaneous internal air pressure. The internal air pressure of the main body 1 is increased. The barometric pressure sensor 32 judges that the user leaves the saddle 100. The switch 204 starts the electronic system of the bicycle 200 to proceed with a standby mode or a sleep mode via the connector 33 of the sensing module 3.

When the user sits on the bicycle 200, the saddle 100 is pressed downward, so the volume of the saddle 100 becomes smaller. At the moment, the accommodating space 14 inside the main body 1 of the saddle 100 generates the instantaneous high air pressure. The internal air pressure of the main body 1 is increased. The barometric pressure sensor 32 senses the variation of the internal air pressure of the main body 1. The connector 33 transmits the signal to the IoT device (not shown) or the controller (not shown) of the bicycle 200 to wake up the electronic system of the bicycle 200 by the cable 35. At the moment, the switch 204 starts the electronic system of the bicycle 200. The switch 204 applies the keyless start system to replace the ordinary key, so that the bicycle 200 has the better security.

As described above, the barometric pressure sensor 32 senses the variation of the internal air pressure of the main body 1 to make the saddle 100 and the bicycle 200 with the saddle 100 judge whether the user sits on the saddle 100, and the saddle 100 has the contactless sensor which contactlessly senses the pressure, so the sensing module 3 of the saddle 100 senses the variation of the internal air pressure of the main body 1 by a contactless way. The bicycle 200 with the saddle 100 applies the keyless start system to replace the ordinary key, so that the bicycle 200 has the better security.

What is claimed is:

1. A saddle, comprising:
   a main body, an inside of the main body defining an accommodating space penetrating through a bottom surface of the main body, a rear end of the bottom surface of the main body being recessed inward to form a notch, the notch being communicated with the accommodating space;
   a protecting layer attached to a top of the main body;
   a sensing module disposed in the accommodating space through the notch, the sensing module including a circuit board and a barometric pressure sensor, the barometric pressure sensor being disposed on a top surface of the circuit board, the barometric pressure sensor and the main body being separated by the accommodating space, the barometric pressure sensor being a contactless sensor;
   a base cover disposed to the bottom surface of the main body, and the base cover covering the notch, so the accommodating space forming an airtight space, a top surface of the base cover extending upward to form a fastening pillar, the fastening pillar being inserted into the accommodating space to support the circuit board; and
   a bow element disposed to a bottom surface of the base cover.

2. The saddle as claimed in claim 1, wherein the sensing module includes a connector and a location hole, the connector is disposed on the top surface of the circuit board, a cable is connected with the connector, the location hole penetrates through the top surface and a bottom surface of the circuit board, the fastening pillar is inserted into the location hole.

3. The saddle as claimed in claim 2, wherein the bottom surface of the main body has a wire groove, a middle of the rear end of the bottom surface of the main body is recessed inward to form the notch, the wire groove is communicated with the notch, the cable is partially disposed in the wire groove.

4. The saddle as claimed in claim 1, wherein a front end of the top surface of the base cover extends upward to form a protruding block, the protruding block is hollow, a front end of the bottom surface of the main body is recessed inward to form a concave portion, the protruding block is disposed to the concave portion.

5. The saddle as claimed in claim 4, wherein a front end of the bottom surface of the base cover is recessed inward to form a lacking groove, the front end of the bottom surface of the base cover extends downward to form a shielding portion, the shielding portion is disposed to a front end of the lacking groove.

6. The saddle as claimed in claim 5, wherein the bow element has two supporting portions, front ends of the two supporting portions slantwise extend frontward and inward to form two inclining portions, respectively, the two inclining portions are inclined upward from rear to front, front ends of the two inclining portions extend frontward, and then are bent towards each other and are connected with each other to form a U-shaped combining portion, the combining portion is disposed to the lacking groove of the base cover.

7. The saddle as claimed in claim 6, wherein rear ends of the two supporting portions extend rearward to form two insertion portions, respectively, two portions of a rear end of the bottom surface of the base cover extend downward to form two restricting blocks, each restricting block is a hollow structure, each insertion portion is corresponding to one restricting block, two restricting holes penetrate through two front surfaces of the two restricting blocks, respectively, one end of each insertion portion is connected with the rear end of one supporting portion, the other end of each insertion portion is inserted into the restricting hole of the one restricting block and the other end of each insertion portion is fastened in the one restricting block.

8. A bicycle, comprising:
   a frame;
   a headstock connected with a front end of the frame;
   two wheels connected with the front end of the frame and a rear end of the frame, respectively; and a saddle disposed to a middle of a top of the frame, the saddle including a main body, an inside of the main body defining an accommodating space, the accommodating space penetrating through a bottom surface of the main body, a middle of a rear end of the bottom surface of the main body being recessed inward to form a notch, a protecting layer attached to a top of the main body, a sensing module disposed in the accommodating space through the notch, the sensing module including a circuit board and a barometric pressure sensor, the barometric pressure sensor being disposed on a top surface of the circuit board, the barometric pressure sensor and the main body being separated by the accommodating space, the barometric pressure sensor being a contactless sensor, a base cover disposed to the bottom surface of the main body, and the base cover covering the notch and the accommodating space, so the accommodating space forming an airtight space, a top surface of the base cover extending upward to form a fastening pillar, the fastening pillar being inserted into the accommodating space from the notch to support the circuit board, and a bow element disposed to a bottom surface of the base cover and connected with the middle of the top of the frame.

9. The bicycle as claimed in claim 8, wherein the sensing module includes a connector and a location hole, the connector is disposed on the top surface of the circuit board, a cable is connected with the connector, the location hole penetrates through the top surface and a bottom surface of the circuit board, the fastening pillar is inserted into the location hole.

10. The bicycle as claimed in claim 9, wherein the bottom surface of the main body has a wire groove, the wire groove is communicated with the notch, the cable is partially disposed in the wire groove.

11. A saddle disposed to a middle of a top of a frame of a bicycle, comprising:

a main body having an accommodating space formed inside of the main body, the accommodating space penetrating through a bottom surface of the main body, and a notch penetrating through a middle of a rear end of the bottom surface of the main body, the notch being communicated with the accommodating space;

a protecting layer attached to a top of the main body;

a sensing module disposed in the accommodating space through the notch, the sensing module including a circuit board, a barometric pressure sensor disposed on a top surface of the circuit board, the barometric pressure sensor and the main body being separated by the accommodating space, the barometric pressure sensor being a contactless sensor, the barometric pressure sensor judging whether a user sits on the saddle by sensing a variation of an internal air pressure of the main body, a connector disposed on the top surface of the circuit board, and a cable, one end of the cable being connected with the connector;

a base cover disposed to the bottom surface of the main body, and the base cover covering the notch and the accommodating space, so the accommodating space forming an airtight space, a top surface of the base cover extending upward to form a fastening pillar, the fastening pillar being inserted into the accommodating space from the notch to support the circuit board; and a bow element disposed to a bottom surface of the base cover and connected with the middle of the top of the frame.

* * * * *